M. JOHNSON.
Hoes.
No. 136,733.            Patented March 11, 1873.
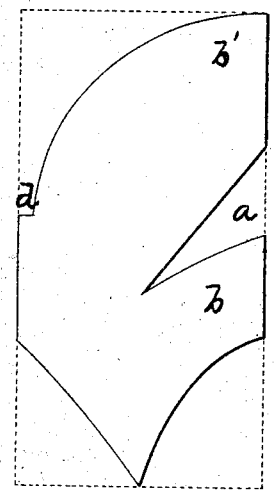
Fig. 1.
Fig. 2.
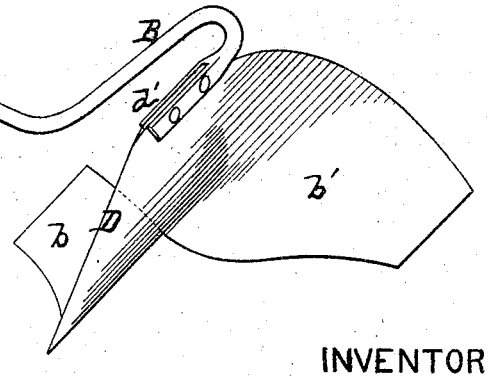
WITNESSES.
Villette Anderson.
A. B. Fraser
INVENTOR.
Moses Johnson
Chipman Fosmer & Co
Attys

UNITED STATES PATENT OFFICE.

MOSES JOHNSON, OF THREE RIVERS, MICHIGAN, ASSIGNOR OF ONE-HALF HIS RIGHT TO ABRAHAM FEAS, OF SAME PLACE.

IMPROVEMENT IN HOES.

Specification forming part of Letters Patent No. 136,733, dated March 11, 1873.

*To all whom it may concern:*

Be it known that I, MOSES JOHNSON, of Three Rivers, in the county of St. Joseph and State of Michigan, have invented a new and valuable Improvement in Hoes; and I do hereby declare that the following is a full, clear, and exact description of the construction and operation of the same, reference being had to the annexed drawing making a part of this specification, and to the letters and figures of reference marked thereon.

Figure 1 of the drawing is a representation of a plan view of the blank. Fig. 2 is a perspective view of the hoe complete.

This invention has relation to hoes; and it consists in the novel construction of the blade or head with an upright cutter, a wing, and mold-board, substantially as hereinafter more fully described; the object being to adapt the hoe to use in cutting weeds, turning furrows, pulverizing the soil, and accomplishing all the other requirements of a first-class combination hoe and hand cultivator.

The improved hoe-head is preferably formed from a blank cut from a sheet of steel or other suitable material; but may, if desired, be molded at once to the proper shape.

Fig. 1 of the accompanying drawing clearly illustrates the form of the blank. The blank has at its forward end two converging edges, meeting in a point and sharpened. From these edges the sides of the blank extend rearwardly in parallel lines, one edge continuing to the end of the blank, and the other terminating about half-way back at an oblique slit, *a*, cut in the blank. Back of this slit the metal is extended laterally to form an oblique wing, *b*. In the rear end of the blank is cut a notch, *d*. The hoe-head is formed from this blank by bending the wing *b* to the right and the wing *b'* to the left, of the center of the blank in a more or less oblique or concavo-convex manner, according to the use to which the hoe is to be put. The hoe-head thus formed has two wings and a central upright ridge, and, when attached to its handle by means of the slotted goose-neck shank B, may be used to great advantage in pulverizing, cutting weeds, cultivating, turning furrows, or performing any kind of field or garden hoe work.

The wing *b* is generally curved to a form similar to that of the mold-board of a plow, so that, by tilting the hoe a little to one side, a smooth furrow may be turned.

For performing any delicate work either of the wings, or any available part of the hoe-head, may be used separately.

In some cases the wing *b* will be turned to the right and the wing *b'* to the left, while in other cases the wing *b'* will be turned to the right and the wing *b* to the left.

The connection of the shank B is rendered more secure by elevating the upright portion D of the head to form a lug, *d'*, which the sides of the slot in the lower part of the shank will embrace.

What I claim as my invention, and desire to secure by Letters Patent, is—

The improved hand implement or hoe, having the side wings *b b'* arranged one in front of the other, and the upright cutter D, substantially as specified.

In testimony that I claim the above I have hereunto subscribed my name in the presence of two witnesses.

MOSES JOHNSON.

Witnesses:
R. R. PEALER,
L. E. DUGAS.